(12) United States Patent
Kadosh

(10) Patent No.: US 10,824,318 B1
(45) Date of Patent: Nov. 3, 2020

(54) SYSTEM, METHOD, AND COMPUTER PROGRAM FOR AUTOMATIC USER INTERFACE LAYOUT ORGANIZATION

(71) Applicant: Amdocs Development Limited, Limassol (CY)

(72) Inventor: Yoav Kadosh, Pardes Hanna Karkur (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 62 days.

(21) Appl. No.: 16/169,889

(22) Filed: Oct. 24, 2018

(51) Int. Cl.
  G06F 3/0481 (2013.01)
  G06F 3/0484 (2013.01)

(52) U.S. Cl.
  CPC ........ G06F 3/04847 (2013.01); G06F 3/0481 (2013.01)

(58) Field of Classification Search
  CPC ...... G06F 3/048; G06F 3/0481; G06F 3/0482; G06F 3/0484
  See application file for complete search history.

(56) References Cited

U.S. PATENT DOCUMENTS

| | | | |
|---|---|---|---|
| 6,392,673 B1 | 5/2002 | Andrew et al. | |
| 6,667,750 B1 | 12/2003 | Halstead, Jr. et al. | |
| 7,370,284 B2 | 5/2008 | Andrea et al. | |
| 8,561,036 B1 | 10/2013 | Beans et al. | |
| 2005/0094206 A1* | 5/2005 | Tonisson | G06F 40/103 358/1.18 |
| 2005/0094207 A1* | 5/2005 | Lo | G06F 40/174 358/1.18 |
| 2005/0108655 A1 | 5/2005 | Andrea et al. | |
| 2006/0253775 A1 | 11/2006 | Ovetchkine et al. | |
| 2017/0344656 A1* | 11/2017 | Koren | G06F 3/0484 |

FOREIGN PATENT DOCUMENTS

| | | |
|---|---|---|
| CN | 104657034 A | 5/2015 |
| EP | 1206754 A1 | 5/2002 |
| EP | 1583036 A2 | 10/2005 |

OTHER PUBLICATIONS

Scientific Toolworks, "Understand Source Code Analysis & Metrics: User Guide and Reference Manual (Version 2.0)," Scientific Toolworks Inc, Mar. 2008, 266 pages.

(Continued)

*Primary Examiner* — Xiomara L Bautista
(74) *Attorney, Agent, or Firm* — Zilka-Kotab, P.C.

(57) ABSTRACT

A system, method, and computer program product are provided for automatic user interface layout organization. In operation, a system receives an action representing at least one modification to a source user interface layout, or an unbalanced layout (a layout that violates the constraints). The system receives a list of constraints that define the validity of a given layout. The system creates a list of all possible valid user interface layout permutations including the at least one modification based on the constraints. The system determines a difference between the source user interface layout and each of the possible valid layout permutations. Further, the system selects one of the possible valid layout permutations that is least different from the source user interface layout to be used as a target user interface layout including the at least one modification.

20 Claims, 6 Drawing Sheets

(56) References Cited

OTHER PUBLICATIONS

Non-Final Office Action from U.S. Appl. No. 16/163,458, dated Oct. 18, 2019.
Todorov, A., "Mutation Testing vs. Coverage: a practical experiment to find out which one is better," atodorov.org, Dec. 27, 2016, pp. 1-11, retrieved from http://atodorov.org/blog/2016/12/27/mutation-testing-vs-coverage/.
Atlassian, "About Code Coverage," Atlassian, Jun. 30, 2017, pp. 1-3, retrieved from https://confluence.atlassian.com/clover/about-code-coverage-71599496.html.

* cited by examiner

US 10,824,318 B1

SYSTEM, METHOD, AND COMPUTER PROGRAM FOR AUTOMATIC USER INTERFACE LAYOUT ORGANIZATION

FIELD OF THE INVENTION

The present invention relates to generating user interface layouts, and more particularly to a system for automatic user interface layout organization.

BACKGROUND

Many modern user interfaces (UIs) give users the flexibility to reorganize (e.g. add, remove, resize, etc.) sections within the UI layout. However, such flexibility leads to uncertainty regarding the visual state of the UI in any given layout permutation since there are many possible permutations, and without enforcing some constraints, it is impossible to prepare a design for each possible permutation.

There is thus a need for addressing these and/or other issues associated with the prior art.

SUMMARY

A system, method, and computer program product are provided for automatic user interface layout organization. In operation, a system receives an action representing at least one modification to a source user interface layout, or an unbalanced layout (a layout that violates the constraints). The system receives a list of constraints that define the validity of a given layout. The system creates a list of all possible valid user interface layout permutations including the at least one modification based on the constraints. The system determines a difference between the source user interface layout and each of the possible valid layout permutations. Further, the system selects one of the possible valid layout permutations that is least different from the source user interface layout to be used as a target user interface layout including the at least one modification.

DETAILED DESCRIPTION

Figure 1:
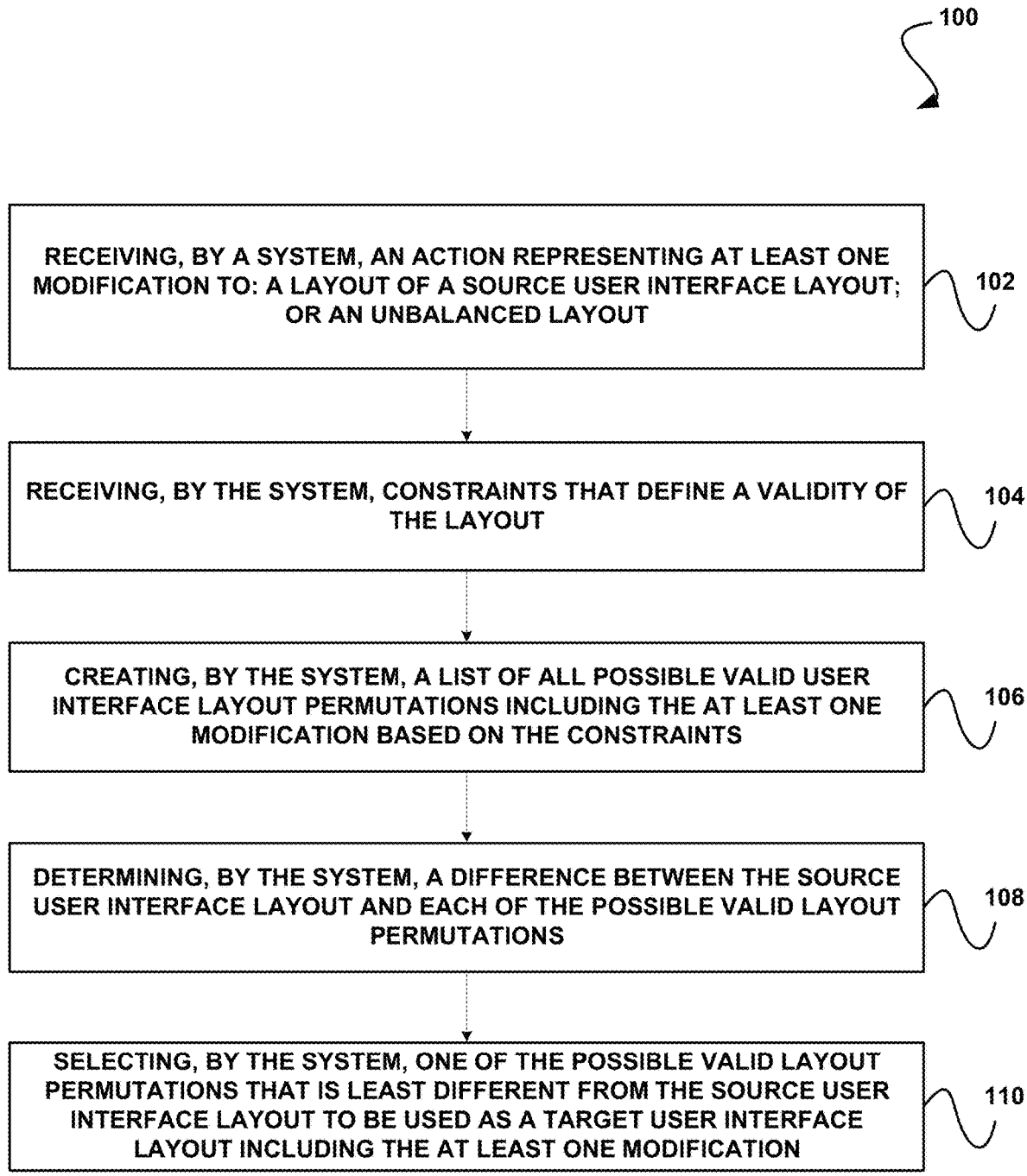
FIG. 1 illustrates a method for automatic user interface layout organization, in accordance with one embodiment.

FIG. 1 illustrates a method 100 for automatic user interface layout organization, in accordance with one embodiment.

In operation, a system receives an action representing at least one modification to a layout of a source user interface layout, or an unbalanced layout. See operation 102. The user interface may include any type of user interface, including various modules and graphics, etc., and may be associated with any industry. The action may include any action to modify or reorganize the source user interface layout, for example, by adding material, removing material, or resizing material, etc.

The system receives a list of constraints that define the validity of a given layout. See operation 104. The constraints may include layout constraints comprising rules associated with all of the source user interface layout and/or section constraints comprising rules associated with sections of the source user interface layout.

The system creates a list of all possible valid user interface layout permutations including the at least one modification based on the constraints. See operation 106. The possible valid user interface layout permutations may include all valid user interface layouts that satisfy the constraints.

The system determines a difference between the source user interface layout and each of the possible valid layout permutations. See operation 108. In one embodiment, determining the difference between the source user interface layout and each of the possible valid layout permutations may include calculating a numerical value for each of the possible valid layout permutations. Additionally, in one embodiment, determining the difference between the source user interface layout and each of the possible valid layout permutations may include weighting the determined differences based on the user action.

The system selects one of the possible valid layout permutations that is least different from the source user interface layout to be used as a target user interface layout including the at least one modification. See operation 110. The system may offer the selected target as an optional layout to utilize or automatically implement the target layout.

It should be noted that the method 100 may be implemented utilizing various systems, hardware, software, applications, user interfaces, etc., as dictated by the implementer. For example, the system implementing the method 100 may include one or more processors, databases, etc., as well as implement various logic, computer code, applications, and/or user interfaces, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
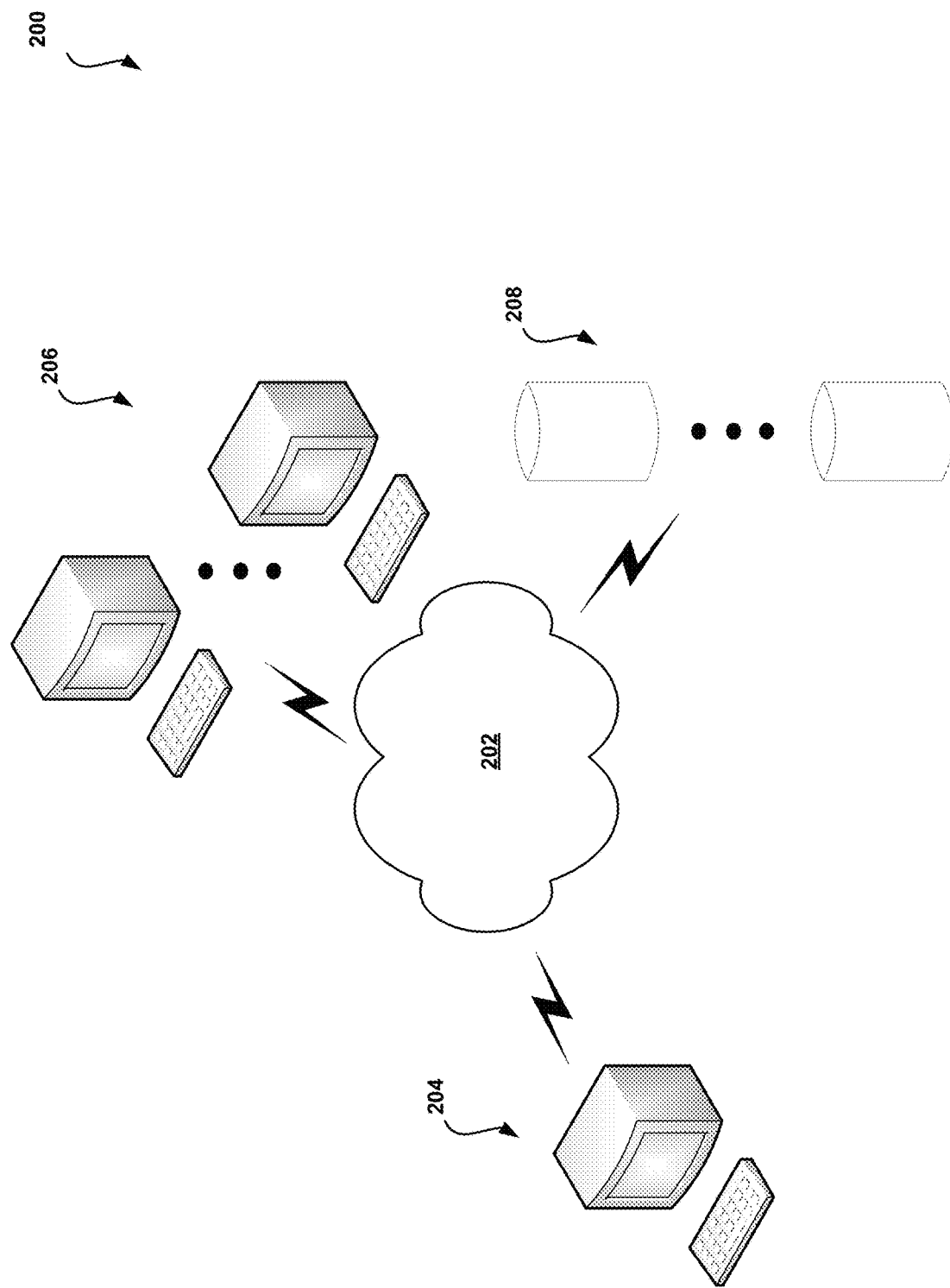
FIG. 2 shows a system for automatic user interface layout organization, in accordance with one embodiment.

FIG. 2 shows a system 200 for automatic user interface layout organization, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, the system 200 includes a Layout Organization system 204, which may implement a variety of applications or software, etc. The Layout Organization system 204 may be capable of communicating with a plurality of systems 206, either directly or over one or more networks 202, for performing automatic user interface layout organization. The Layout Organization system 204 may also be in communication with one or more repositories/databases 208.

The Layout Organization system 204 is a system in which every section within a user interface layout defines its own set of constraints, and the reorganization of these sections by the user will be applied within the boundaries of those constraints. The system is also capable of defining layout-wide constraints (i.e. max. number of sections).

When a user reorganizes a layout, an algorithm is used by the Layout Organization system 204 to produce the most valid layout based on the initial layout (the layout organization prior to the user action), the target layout (the layout organization that the user is attempting), and the list of layout section constraints. Or, in the case of layout balancing, the system is given an unbalanced layout (a layout that violates the constraints) and produces the most valid layout based on the given constraints.

The algorithm used by the Layout Organization system 204 determines the most valid layout by creating a list of all the possible valid layout permutations (a valid permutation is one that satisfies all the size constraints), then determining the difference between the source and target layout, and selecting the layout that is the least different from the target layout.

Figure 3:
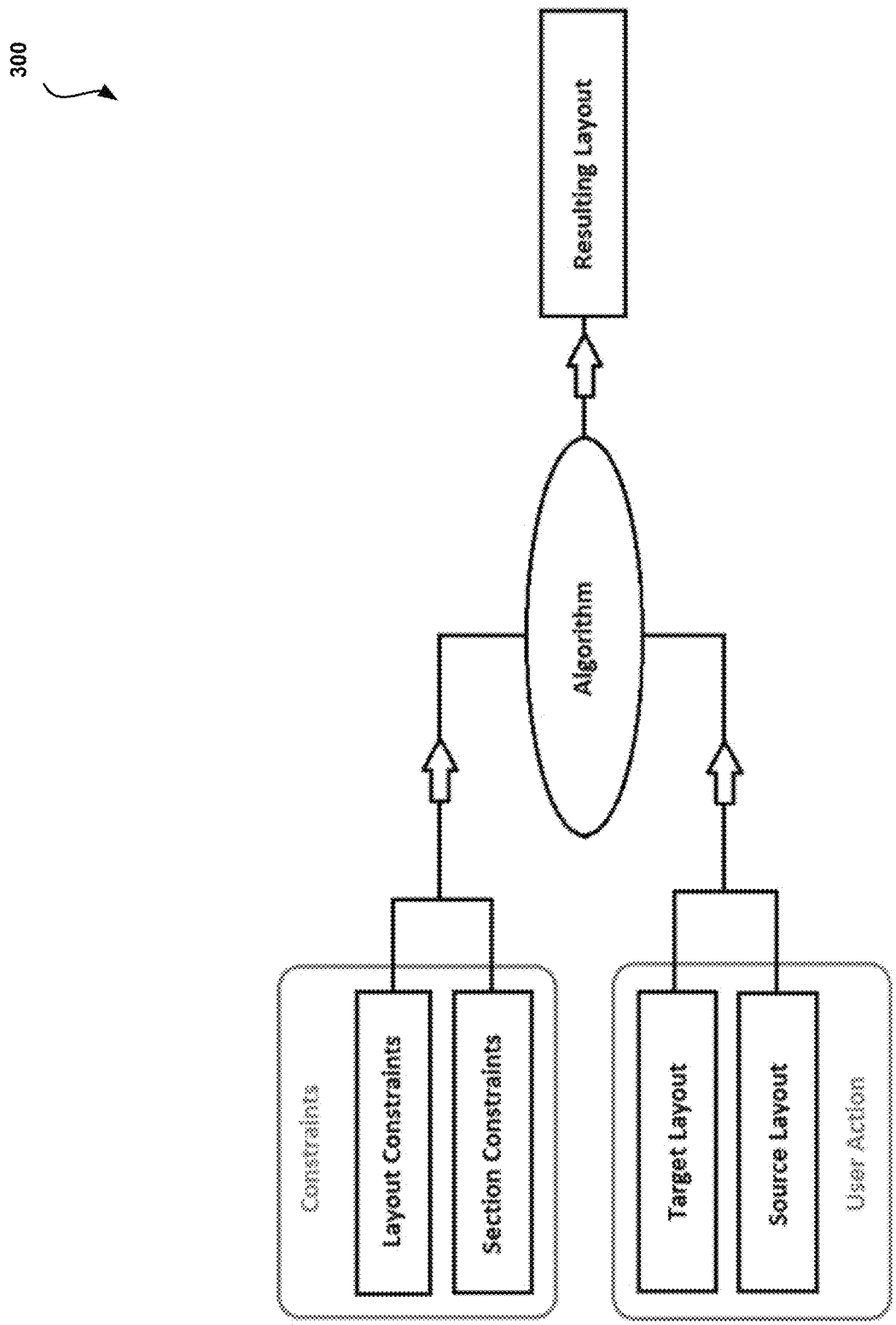
FIG. 3 shows a system flow diagram illustrating an algorithm for automatic user interface layout organization, in accordance with one embodiment.

FIG. 3 shows a flow diagram 300 illustrating an algorithm for automatic user interface layout organization, in accordance with one embodiment. As an option, the flow diagram 300 may be implemented in the context of the details of the previous figures and/or any subsequent figure(s). Of course, however, the flow diagram 300 may be implemented in the context of any desired environment. Further, the aforementioned definitions may equally apply to the description below.

The Layout Organization system produces a layout based on a user action. A user action is described by two layouts, the source layout and the target layout. Once the user action is received by the Layout Organization system, the system uses layout and section constraints to produce a result layout, as shown in FIG. 3.

The Layout Organization system can also produce a layout based on an unbalanced layout (a layout that violates the constraints). The system uses layout and section constraints to produce a result layout.

In the context of the present description, the term section refers to a re-organizable layout component that can be added to the layout, removed from the layout, or resized. Constraints refer to a list of rules constraining the reorganization of a given layout. Layout constraints refer to a list of rules defined on the whole layout. This may include, for example, the total number of sections that a layout can contain at any given moment, or the max accumulated size of all sections.

Section constraints refer to a list of rules defined per section, limiting the actions to be performed on it. These constraints are defined as the dimensions that a section supports, but can be enhanced to support conditions (e.g. define supported dimensions based on screen size, etc.). Dimensions refer to the width/height of a given section. Condition refers to a Boolean statement to be checked against when applying the constraints, to determine whether the constraint should be applied or ignored.

Further, in the context of the present description, a layout represents a list, or possibly a matrix of sections. A valid layout refers to any layout that satisfies the layout and section constraints. User action refers to an attempt by a user to reorganize a given layout by adding/removing or resizing sections within it. User action is defined by two layouts, a source layout (which refers to the layout prior to the user action) or a target layout (which refers to the desired layout as it is defined by the user). A result layout refers to a valid layout, which is the layout least different from the target layout. Work refers to a numerical value used as a measurement unit to determine the distance between two layouts, based on the user action and the constraints. The result layout is the layout that requires the least work.

Figure 4:
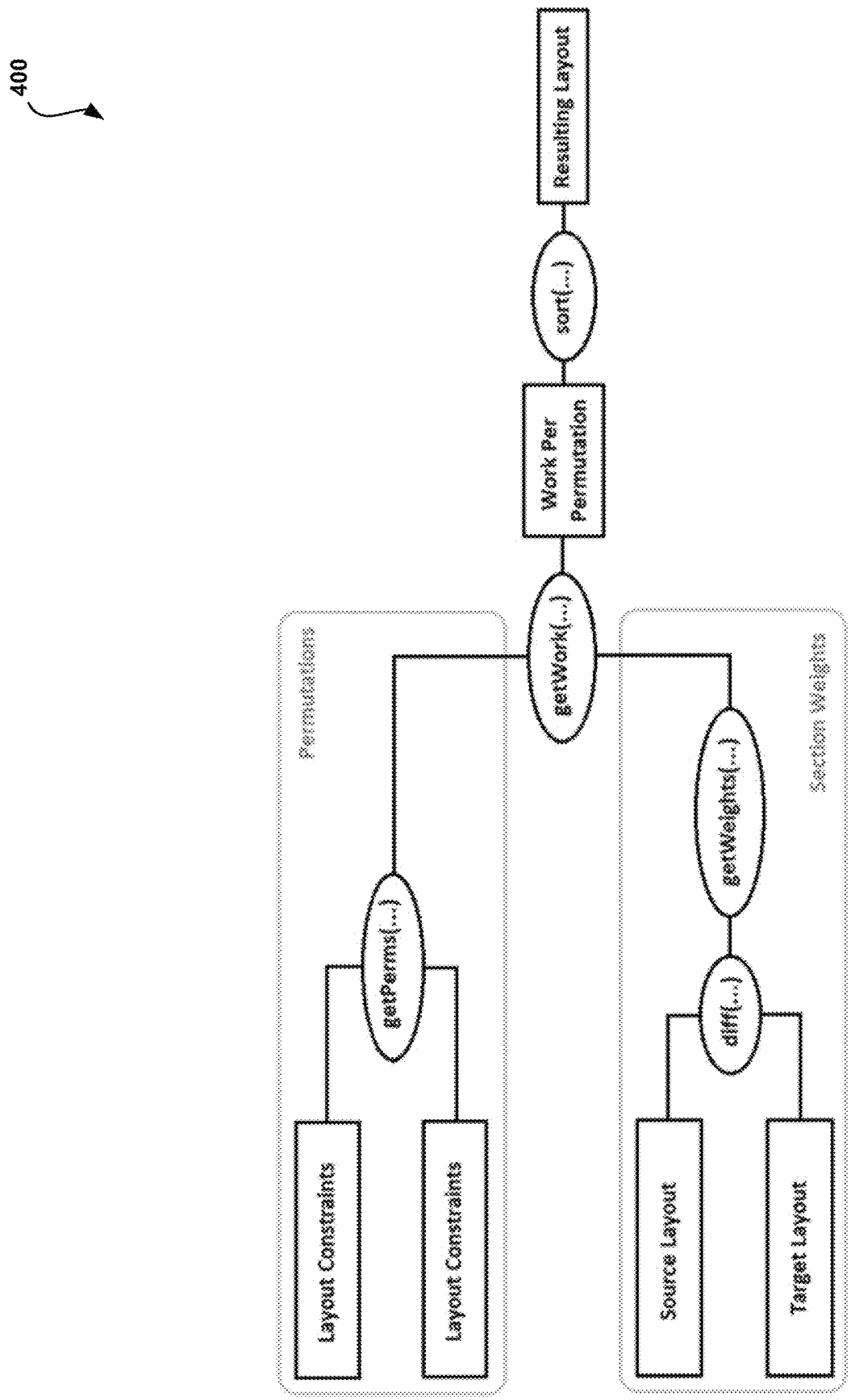
FIG. 4 shows a flow diagram illustrating an algorithm for automatic user interface layout organization, in accordance with one embodiment.

FIG. 4 shows a flow diagram 400 illustrating an algorithm for automatic user interface layout organization, in accordance with one embodiment. As an option, the flow diagram 400 may be implemented in the context of the details of the previous figures and/or any subsequent figure(s). Of course, however, the flow diagram 400 may be implemented in the context of any desired environment. Further, the aforementioned definitions may equally apply to the description below.

As an example implementation, in one manifestation, the Layout Organization system can operate in a grid layout, in which a layout is divided into 12 columns, and each section can occupy 0-12 columns. The 12 columns represent the layout constraints, and each section can define a section constraint in the form of the number of columns that it supports.

For example, a layout constraint may include that a layout is only valid if all of its sections add up to 12 columns, and section constraints may include: Section A supports 2 and 4 columns; and Section B supports 10 and 8 columns.

In this example, if the Layout Organization system takes all of the constraints into account, there can only be two valid layouts. These two valid layouts are referred to as layout permutations. In this example, Layout Permutation 1 refers to a layout in which Section A takes 2 columns and Section B takes 10, and Layout Permutation 2 refers to a layout in which Section A takes 4 columns and Section B takes 8. This can be represented as: LP1=[2,10]; and LP2=[4,8].

If it is assumed for the purposes of this example that the initial layout is Layout Permutation 1, and that the user attempts to increase the size of Section A from 2 to 4 columns, then: Source Layout=[2,10]; and Target Layout=[4,10]. The Source Layout and the Target Layout together represent a User Action.

The next step is for the Layout Organization system to compute the difference between the Source Layout and the Target Layout. In this example, the difference is computed as the absolute value of the change in size in each section. Section A has increased by 2, and Section B has not changed: diff(Source Layout, Target Layout)=[2,0].

Based on that, the Layout Organization system can compute the section weights. Section weights are used in the next step to compute the work it would take to move from the Target Layout to each layout permutation. Highest weights are assigned to sections that have changed, and then the weights exponentially decrease for each consecutive section. The highest value is calculated as the number of sections squared. In this example: Get Weights(diff ( . . . ))=[4,2].

The Layout Organization system can then proceed to assign a numeric work value to each layout permutation, and then sort them by the work values. The work can be computed in this example by multiplying the weight of each section by the difference between it and the corresponding section in the Target Layout. For example: diff(Target Layout, LP1)=[2,0]; diff(Target Layout, LP2)=[0,2]. Then, based on that, the Layout Organization system can compute the work for each permutation: work(Target Layout, LP1)=4*2+2*0=8; work(Target Layout, LP2)=4*0+2*2=4. Sorting them from least work needed to most work needed, yields: sort( . . . )=[LP2, LP1].

This means that LP2 is the Result Layout as it is the Valid Layout that is the closest to the Target Layout in terms of work. To put that into simple words, the user wanted to increase Section A from 2 to 4, and the Layout Organization system determined that in order to satisfy the constraints, Section B would need to be reduced in size from 10 to 8.

This is just a simple example showing one application for the Layout Organization system. However, the usage can be extended to support more complex constraints and layouts.

Figure 5:
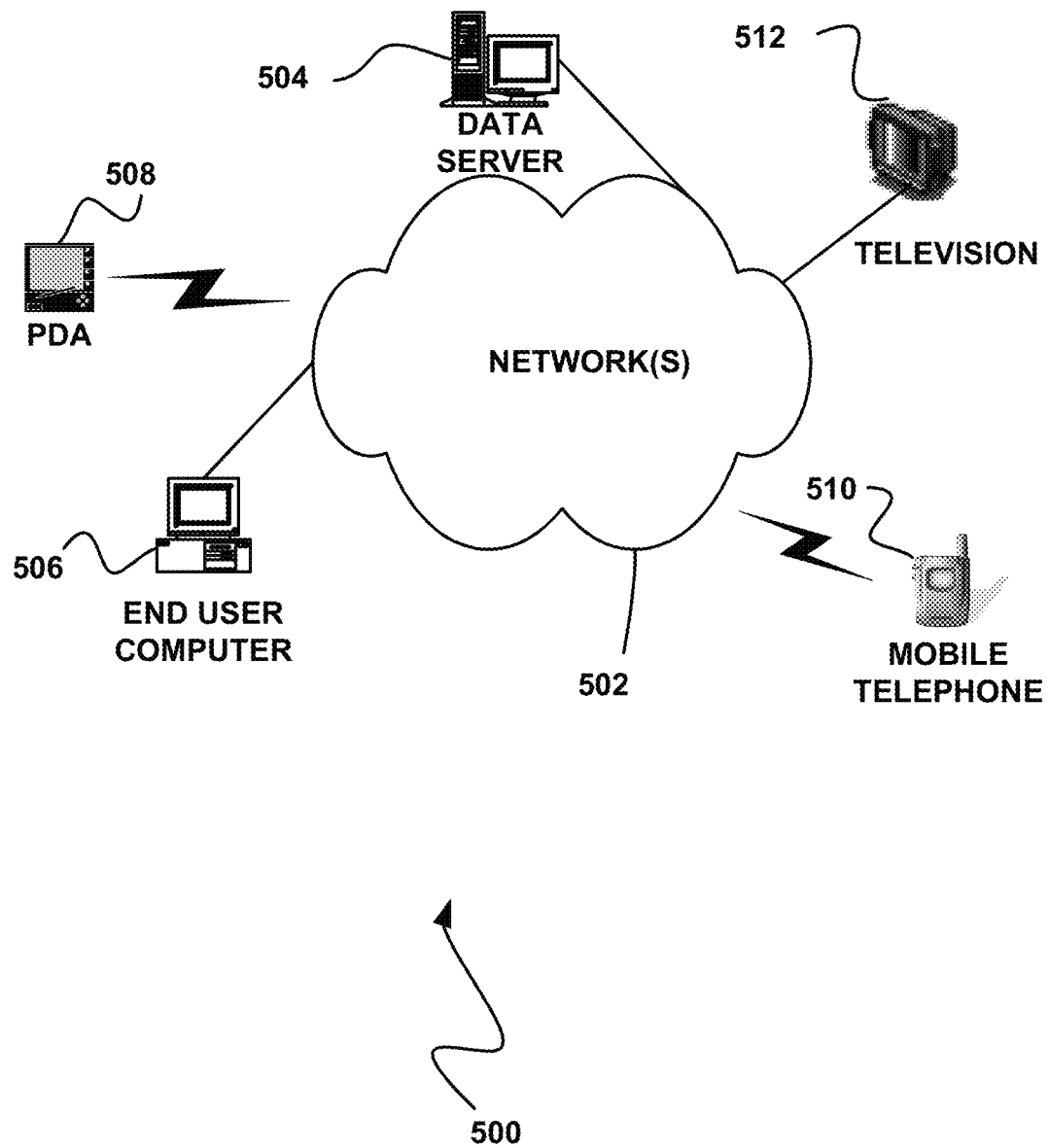
FIG. 5 illustrates a network architecture, in accordance with one possible embodiment.

FIG. 5 illustrates a network architecture 500, in accordance with one possible embodiment. As shown, at least one network 502 is provided. In the context of the present network architecture 500, the network 502 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 502 may be provided.

Coupled to the network 502 is a plurality of devices. For example, a server computer 504 and an end user computer 506 may be coupled to the network 502 for communication purposes. Such end user computer 506 may include a desktop computer, lap-top computer, and/or any other type of logic. Still yet, various other devices may be coupled to the network 502 including a personal digital assistant (PDA) device 508, a mobile phone device 510, a television 512, etc.

Figure 6:
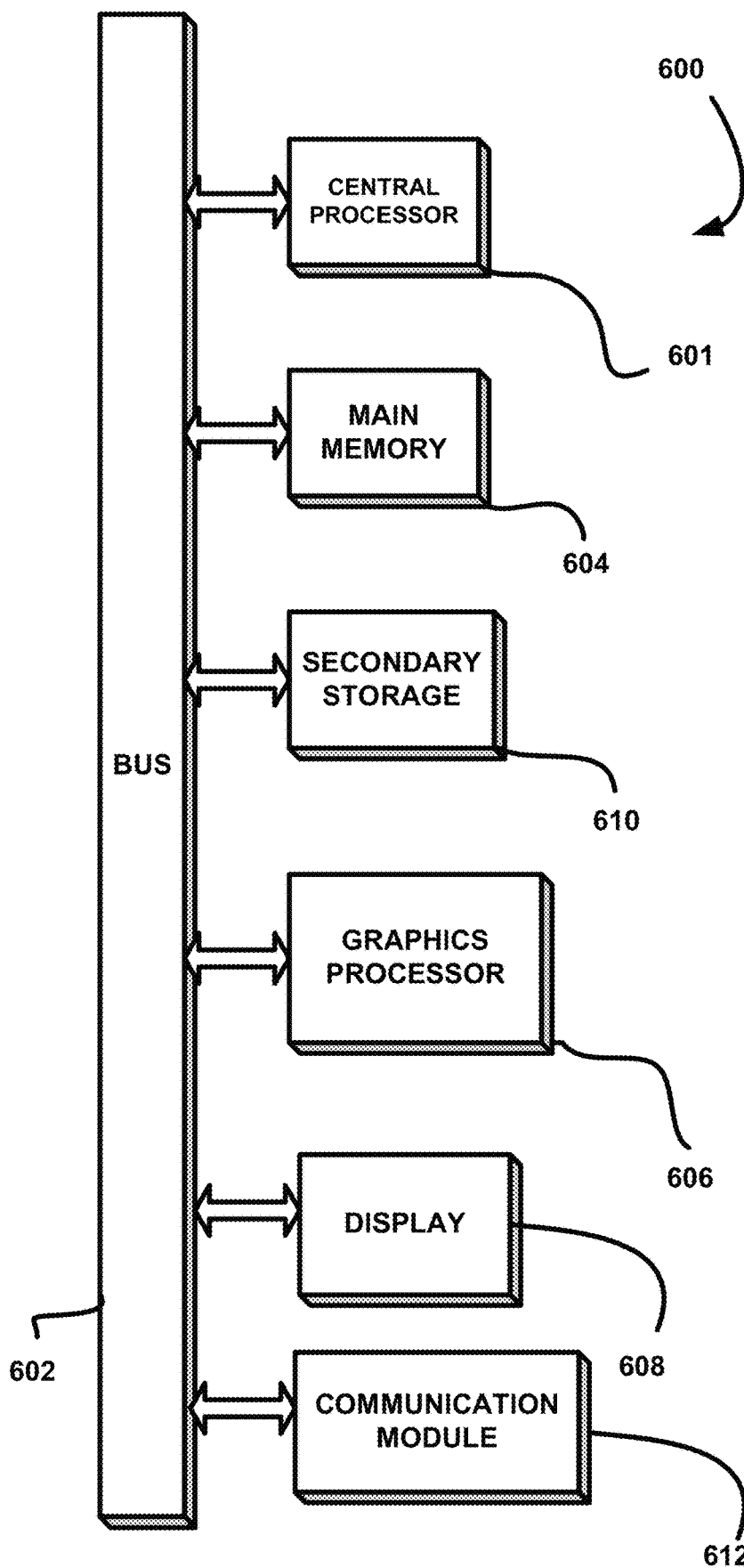
FIG. 6 illustrates an exemplary system, in accordance with one embodiment.

FIG. 6 illustrates an exemplary system 600, in accordance with one embodiment. As an option, the system 600 may be implemented in the context of any of the devices of the network architecture 500 of FIG. 5. Of course, the system 600 may be implemented in any desired environment.

As shown, a system 600 is provided including at least one central processor 601 which is connected to a communication bus 602. The system 600 also includes main memory 604 [e.g. random access memory (RAM), etc.]. The system 600 also includes a graphics processor 606 and a display 608.

The system 600 may also include a secondary storage 610. The secondary storage 610 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 604, the secondary storage 610, and/or any other memory, for that matter. Such computer programs, when executed, enable the system 600 to perform various functions (as set forth above, for example). Memory 604, storage 610 and/or any other storage are possible examples of non-transitory computer-readable media.

The system 600 may also include one or more communication modules 612. The communication module 612 may be operable to facilitate communication between the system 600 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   receiving, by a system from a user, a request for a target layout of a user interface that includes a modification to an initial layout predefined for the user interface;
   accessing, by the system, layout related constraints defined for the user interface;
   creating, by the system, a list of all possible valid layouts for the user interface that include the modification and satisfy the layout related constraints defined for the user interface;
   determining, by the system, a difference between the target layout of the user interface and each of the possible valid layouts for the user interface; and
   selecting, by the system, one of the possible valid layouts for the user interface that is least different from the target layout of the user interface to be used as a resulting layout for the user interface to be presented to the user.

2. The method of claim 1, wherein the layout related constraints include rules associated with an entirety of the user interface.

3. The method of claim 1, wherein the layout related constraints include rules associated with sections of the user interface.

4. The method of claim 1, wherein determining the difference between the target layout of the user interface and each of the possible valid layouts for the user interface includes calculating a numerical value for each of the possible valid layouts for the user interface.

5. The method of claim 1, wherein determining the difference between the target layout of the user interface and each of the possible valid layouts for the user interface includes weighting the determined differences based on layout sections.

6. The method of claim 1, wherein the modification includes adding material, removing material, or resizing material.

7. The method of claim 1, wherein determining the difference between the target layout of the user interface and each of the possible valid layouts for the user interface includes:
   computing a difference between the initial layout predefined for the user interface and the target layer of the user interface,
   computing section weights for each section of the initial layout predefined for the user interface, the section weight for each section being a function of an amount of change made to the section in the target layout of the user interface,
   computing, based on the section weights, an amount of work to move from the target layout of the user interface to each of the possible valid layouts for the user interface.

8. The method of claim 7, wherein the amount of work to move from the target layout of the user interface to each of the possible valid layouts for the user interface is computed by:
   for each section in the initial layout predefined for the user interface, determining a numerical value for the section by multiplying the section weight of the section by a difference between the section in the possible valid layout and the section in the target layout of the user interface, and
   adding the numerical values determined for the sections in the possible valid layout.

9. The method of claim 7, wherein selecting one of the possible valid layouts to be used as the resulting layout includes selecting one of the possible valid layouts associated with the least amount of work.

10. A computer program product embodied on a non-transitory computer readable medium, comprising computer code for:
    receiving, by a system from a user, a request for a target layout of a user interface that includes a modification to an initial layout predefined for the user interface;
    accessing, by the system, layout related constraints defined for the user interface;

creating, by the system, a list of all possible valid layouts for the user interface that include the modification and satisfy the layout related constraints defined for the user interface;

determining, by the system, a difference between the target layout of the user interface and each of the possible valid layouts for the user interface; and selecting, by the system, one of the possible valid layouts for the user interface that is least different from the target layout of the user interface to be used as a resulting layout for the user interface to be presented to the user.

11. The computer program product of claim 10, wherein the layout related constraints include rules associated with an entirety of the user interface.

12. The computer program product of claim 10, wherein the layout related constraints include rules associated with sections of the user interface.

13. The computer program product of claim 10, wherein determining the difference between the target layout of the user interface and each of the possible valid layouts for the user interface includes calculating a numerical value for each of the possible valid layouts for the user interface.

14. The computer program product of claim 10, wherein determining the difference between the target layout of the user interface and each of the possible valid layouts for the user interface includes weighting the determined differences based on layout sections.

15. The computer program product of claim 10, wherein the modification includes adding material, removing material, or resizing material.

16. A system, comprising one or more processors, operable for:

receiving, by the system from a user, a request for a target layout of a user interface that includes a modification to an initial layout predefined for the user interface;

accessing, by the system, layout related constraints defined for the user interface;

creating, by the system, a list of all possible valid layouts for the user interface that include the modification and satisfy the layout related constraints defined for the user interface;

determining, by the system, a difference between the target layout of the user interface and each of the possible valid layouts for the user interface; and selecting, by the system, one of the possible valid layouts for the user interface that is least different from the target layout of the user interface to be used as a resulting layout for the user interface to be presented to the user.

17. The system of claim 16, wherein the layout related constraints include rules associated with an entirety of the user interface.

18. The system of claim 16, wherein the layout related constraints include rules associated with sections of the user interface.

19. The system of claim 16, wherein determining the difference between the target layout of the user interface and each of the possible valid layouts for the user interface includes calculating a numerical value for each of the possible valid layouts for the user interface.

20. The system of claim 16, wherein determining the difference between the target layout of the user interface and each of the possible valid layouts for the user interface includes weighting the determined differences based on layout sections.

* * * * *